(12) United States Patent
Nonne et al.

(10) Patent No.: US 12,351,918 B2
(45) Date of Patent: Jul. 8, 2025

(54) ROLL CONNECTION

(71) Applicant: ArcelorMittal, Luxembourg (LU)

(72) Inventors: François Nonne, Mondelange (FR); Pauline Briault, Metz (FR)

(73) Assignee: ArcelorMittal, Luxembourg (LU)

( * ) Notice: Subject to any disclaimer, the term of this patent is extended or adjusted under 35 U.S.C. 154(b) by 462 days.

(21) Appl. No.: 17/780,166

(22) PCT Filed: Dec. 9, 2019

(86) PCT No.: PCT/IB2019/060553
§ 371 (c)(1),
(2) Date: May 26, 2022

(87) PCT Pub. No.: WO2021/116727
PCT Pub. Date: Jun. 17, 2021

(65) Prior Publication Data
US 2022/0403495 A1    Dec. 22, 2022

(51) Int. Cl.
*C23C 2/00*    (2006.01)
*B05C 1/08*    (2006.01)
*F16C 13/04*    (2006.01)
*F16C 17/24*    (2006.01)
*F16C 33/08*    (2006.01)

(52) U.S. Cl.
CPC ........ *C23C 2/00344* (2022.08); *B05C 1/0865* (2013.01); *B05C 1/0878* (2013.01); *F16C 13/04* (2013.01); *F16C 17/243* (2013.01); *F16C 33/08* (2013.01); *F16C 2202/22* (2013.01); *F16C 2206/06* (2013.01); *F16C 2210/08* (2013.01); *F16C 2322/12* (2013.01)

(58) Field of Classification Search
USPC ........ 118/419, 423, 420, 424, 258, DIG. 15; 384/98, 907.1, 913, 282, 297; 492/16, 17
See application file for complete search history.

(56) References Cited

U.S. PATENT DOCUMENTS

| 5,571,328 A | * | 11/1996 | Newland | ............. C23C 2/00344 |
| | | | | 118/423 |
| 11,242,589 B2 | | 2/2022 | Niedringhaus et al. | |
| 2011/0150382 A1 | | 6/2011 | Kouscheschi et al. | |

FOREIGN PATENT DOCUMENTS

| CN | 109312441 A | 2/2019 |
| EP | 0556833 A1 | 8/1993 |
| EP | 2522759 A1 | 11/2012 |
| JP | H0230310 A | 1/1990 |
| JP | H07188885 A | 7/1995 |
| JP | H10167444 A | 6/1998 |
| JP | 2001192794 A | 7/2001 |
| JP | 2004244658 A | 9/2004 |
| JP | 2012241209 A | 12/2012 |
| KR | 101529671 B1 | 7/2015 |

(Continued)

OTHER PUBLICATIONS

Search Report of PCT/IB2019/060553 dated Jun. 3, 2020.
Written Opinion of PCT/IB2020/060553.

*Primary Examiner* — Yewebdar T Tadesse
(74) *Attorney, Agent, or Firm* — Davidson Kappel LLC

(57) ABSTRACT

A method and an equipment permitting to optimally handle and support a roll made of at least an inert material and transfer the torque from a bearing to a roll or the other way around without damaging them, the roll and bearing being immersed in molten metal.

8 Claims, 3 Drawing Sheets

(56) References Cited

FOREIGN PATENT DOCUMENTS

WO     WO 2005031178 A1     4/2005
WO     WO 2007073060 A1     6/2007

* cited by examiner

ROLL CONNECTION

The present invention relates to a method and equipment permitting handling and support a roll immersed in a molten metal.

BACKGROUND

In order to coat a substrate, it can be passed through a bath of the desired coating, e.g. a steel strip passing through a bath of molten metal. Most of the time, a sink roll and two guide rolls are immersed in a coating bath to guide a substrate, as represented in FIG. 1. The sink roll is positioned at the bottom of the bath to enable the deflection and passing of the strip in said bath while the two guide rolls are used at the exit of the bath to position the strip vertically, reduce its vibrations and correct the strip crossbow. All these rolls are immersed into the bath and thus subjected to chemical attacks, corrosion and wear due to the conditions of use, i.e.: the nature of the bath and its temperature. Consequently, new rolls with increased resistance against corrosion and wear have been developed to replace the classical metallic ones. These new inert rolls are generally made of ceramic, carbon or carbon composite.

SUMMARY OF THE INVENTION

However, new problems arise when they are used due to their mechanical properties. Consequently, the rolls entirely made of ceramic, carbon or carbon composite, with a protruding part on both sides of the roll, lead to breakage of the roll due to a force concentration between the roll and the shaft when in use, as it has been verified during experimental tests. This is mainly due to the strip pressure on the roll. Consequently, rolls being hollow on each sides of the roll, where a shaft is inserted, are used. This use leads to new problems, especially on the way to support and transport them.

Consequently, a way to connect an inert roll, made of ceramic or carbon, to the bushing needs to be developed in order to handle and support the roll and allow its rotation without damaging it.

It is an object of the present invention to provide a solution solving the aforementioned problem.

The present invention provides a continuous hot dipping apparatus (1) including a tank (2) comprising a bath of molten metal inside (3), a sink roll (4) and at least one guide roll (5), at least one of said guide roll (5) being supported by a bearing (6), said bearing (6) being composed of at least a connection part (7) and a bushing (8), said connection part (7) comprising three successive parts:
 a first part (9) connecting with the bushing (8),
 a second part (10) comprising at least one fastening means (11) attached to a side of said roll (5) and
 a third part (12) having a parallelepiped section with curved angles (13), said third part (12) being inserted inside said roll (5),
 said connection part (7) being made of a material having a higher thermal dilatation coefficient than said roll (5), said coefficient being chosen so that said third part (12) and said roll (5) are pressfitted through thermal dilatation when in the molten metal bath (3).

The present invention also provides a method for installing, in an installation as described above wherein said molten metal is at a temperature $T_{molten\ metal}$, the at least one of said rolls (5) comprising the following steps:
 inserting said third part (12) of the connection part (7) into said roll (5),
 fixing said connection part (6) to the roll (5) using said fastening means (11),
 preheating said roll (5) and said fixed connection part (7) at a temperature $T_{preheating}$ between: $100°$ C.$<T_{preheating}<T_{molten\ metal}+100°$ C. during a period between 8 hours and 5 days,
 placing said roll (5) and said fixed connection part (7) inside said molten metal (3).

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following figures.

DETAILED DESCRIPTION

Figure 1:
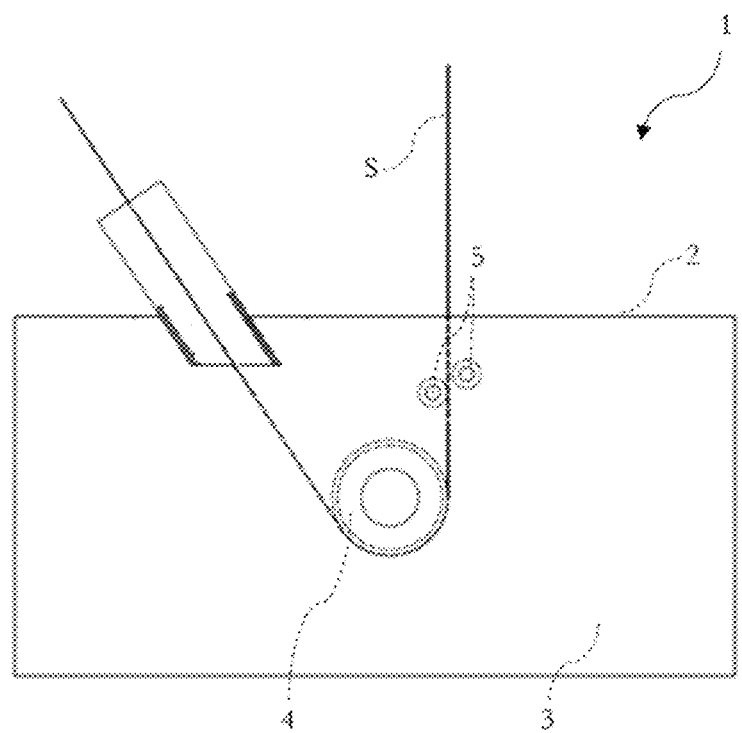
FIG. 1 is a schematic view of an embodiment of a coating bath with a sink roll and two guide rolls.
Figure 2:
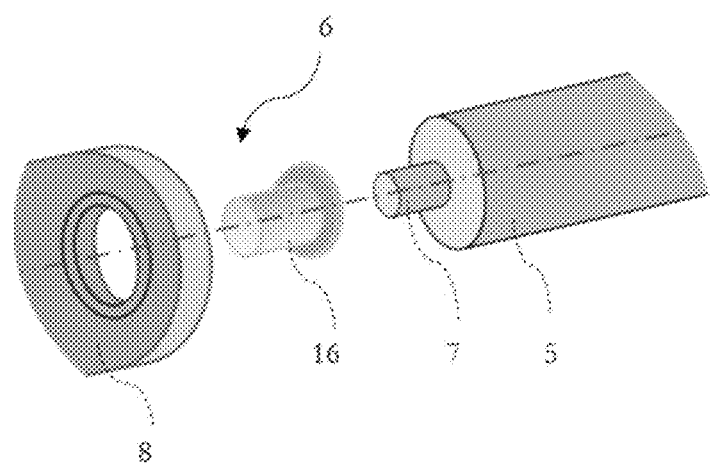
FIG. 2 is a schematic view of an embodiment of a roll exhibiting a bushing, a sleeve, a shaft and a table.
Figure 3:
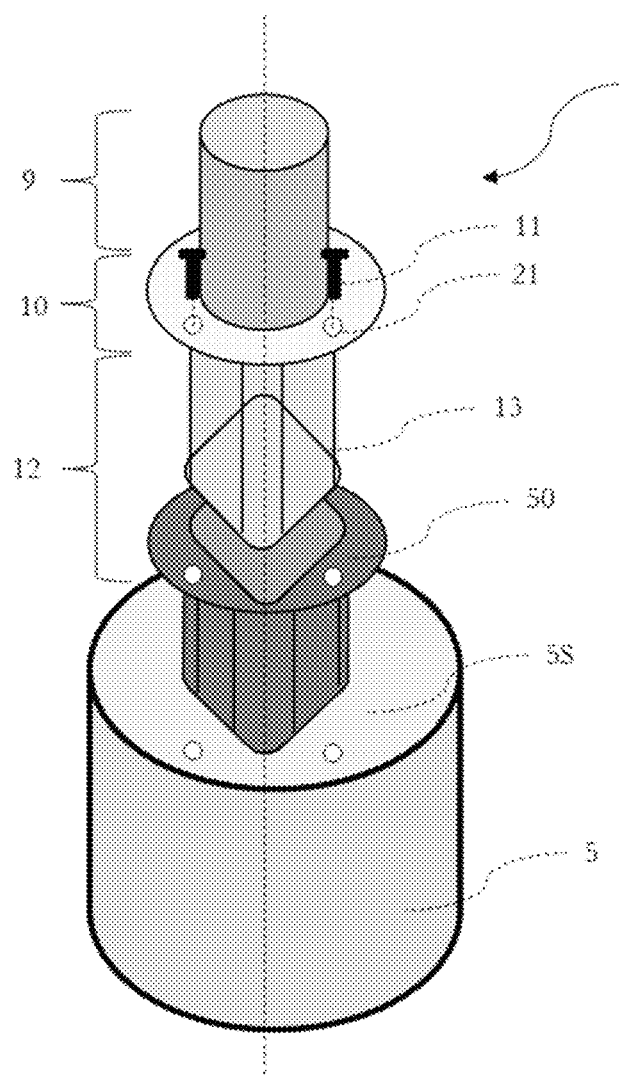
FIG. 3 exhibits an exploded view of an embodiment of a roll connection part and how it can be inserted in a roll.

The invention, as described with respect to FIGS. 1, 2 and 3, relates to a continuous hot dipping apparatus 1 including a tank 2 comprising a bath of molten metal inside 3, a sink roll 4 and at least one guide roll 5, at least one of said guide roll 5 being supported by a bearing 6, said bearing 6 being composed of at least a connection part 7 and a bushing 8, said connection part 7 comprising three successive parts:
 a first part 9 connecting with the bushing 8,
 a second part 10 comprising at least one fastening means 11 attached to a side of said roll 5 and
 a third part 12 having a parallelepiped section with curved angles 13, said third part 12 being inserted inside said roll 5,
 said connection part 7 being made of a material having a higher thermal dilatation coefficient than said roll 5, said coefficient being chosen so that said third part 12 and said roll 5 are pressfitted through thermal dilatation when in the molten metal bath 3.

The following description describes the use of at least a connection part 7 with at least one guide roll 5. But the use of the connection part is not limited to at least one guide roll but it can also be used or inserted inside a sink roll 4.

With the equipment of the present invention, the roll is supported and can rotate without being deteriorated notably due to the curved edges of the third part. Moreover, the fastening means allow a safe handling of the roll at room temperature as well as a correct positioning of the roll prior its use. At room temperature there is a gap between the shaft and the carbon-based core, in other words, there is no pressfit at room temperature.

As illustrated in FIG. 1, the continuous hot dipping apparatus 1 comprises a tank 2 filled with molten metal 3 inside and comprising a sink roll 4, at least one guide roll 5 and a strip S passing through said molten metal.

As illustrated in FIG. 2, at least one of the rolls 5, a sink roll and/or at least a guide roll, is supported by a bearing 6 composed of a connection part 7 and a bushing 8. Moreover, a sleeve 16 can be used between the connection part 7 and the bushing 8.

Figures 4A, 4B:
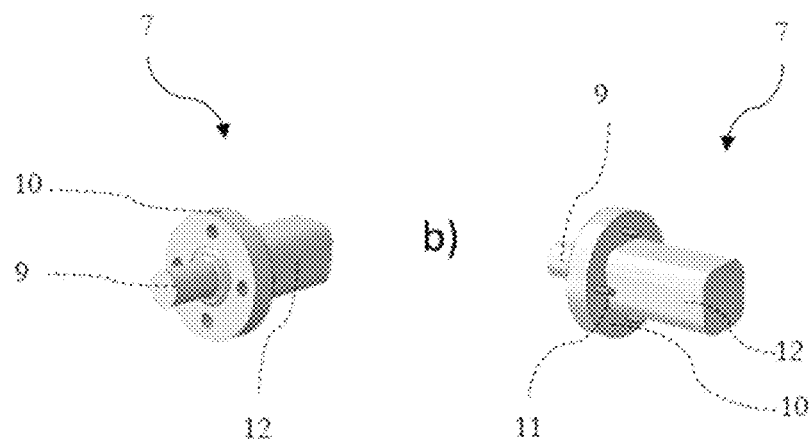
FIGS. 4a and 4b exhibit an embodiment of a roll connection part.

As illustrated in FIGS. 3 and 4a and 4b, the connection part 7 comprises:
  a first connecting part 9,
  a second part 10 comprising at least one fastening means 11 fixed to a roll side 5S,
  a third one 12 being a parallelepiped encompassed by the roll, said parallelepiped having curved edges 13.

Although the shaft 7 is made of three successive parts, it is preferable that a single bloc is machined to form said shaft 7. It enhances the mechanical properties of the piece.

The role of the first part 9 is to be inserted into the sleeve 16 or into the bushing 8. When a sleeve is used, it should fit and at least partly cover the first part and thus reduce the wear. A small clearance or slack, generally around 5 mm while in use, between the first part or the sleeve and the bushing is needed to allow the rotation of the roll.

The second part 10 is wide enough to fix it to a roll side 5S using fastening means 11.

The role of the third part 12 is mainly to connect the roll 5 to the connection part 7 and also transmit the rotation of the roll to the connection part. When the roll 5 and the connection part 7 are immersed in the bath, at a temperature generally comprised between 400° C. and 700° C., this part pressfits the roll 5. The pressfit happens due to a difference of the thermal expansion coefficient between the roll 5 and the connection part 7, said connection part having a bigger coefficient of thermal dilatation than the roll. Three parameters (the breakage risk, the mechanical properties of the roll core and the third piece and the torque transmission) influence greatly the pressfit value aimed. On one hand, if the pressfit is too strong, the third part and/or the roll core might be broken or damaged which should be avoided. On the other hand, if the pressfit is too weak, the roll torque is not efficiently transmitted to the connection part.

Even though it depends on the material used for the connection part and the carbon core and thus their thermal expansion coefficient, the pressfit is generally comprised between −0.10 mm and −0.25 mm.

The third part 12 is parallelepipedic because if wear or crumble occurs, the torque is apparently still transmitted whereas if the third part were cylindrical, the pressfit may not be sufficient leading to a loss of torque transmission. In other words, wear or crumble have less effect on the torque transmission on a parallelepipedic third part than on a cylindrical or round one. Besides, it is important that the parallelepiped edges 13 are not sharp nor right because breakage would occur more often in those cases.

A sleeve 50 can be used for adjusting the pressfit if the pressfit is insufficient. The sleeve permits use of the connection part on rolls having different side hole sizes, and increases the flexibility and the usability of the connection part. The third part 12 should fit in the sleeve 50 and the sleeve 50 should fit in the roll 5. Such sleeve should not hinder the use of the fixation means 11.

Figure 5:
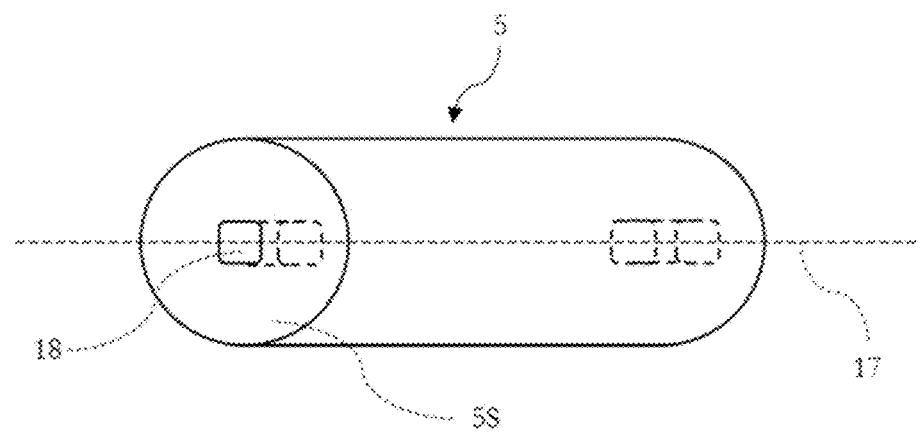
FIG. 5 represents an embodiment of a roll and its two side holes permitting to insert roll connection parts.

As illustrated in FIG. 5, the roll is a cylinder being hollow around its rotation axis 17 on both sides permitting to install connection parts 7 in these holes 18, the hollow parts.

Preferably, said roll is made of at least one carbon or ceramic matrix reinforced with carbon or ceramic fibers. Such rolls permit an increase of the resistance against corrosion because they are inert to the bath condition.

Figure 6:
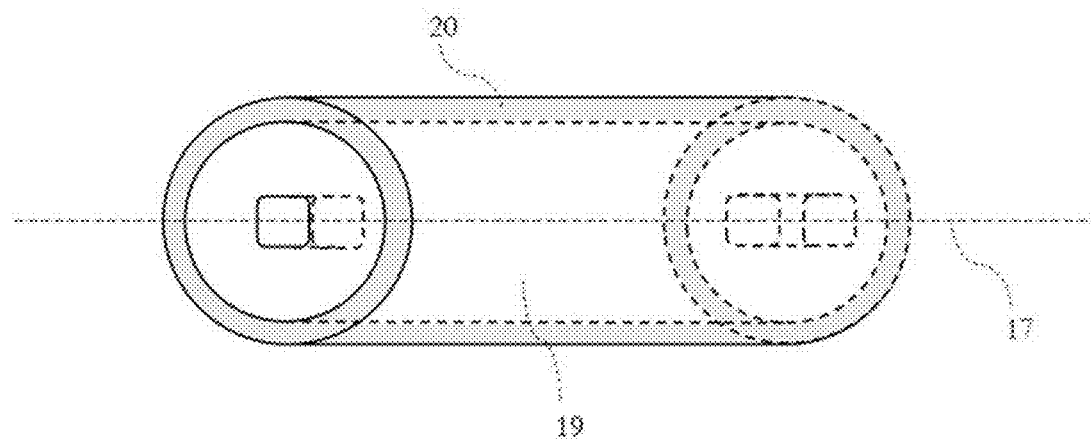
FIG. 6 represents a possible arrangement of the different layers of a roll.

Preferably said roll is made of two different carbon matrixes reinforced with carbon or ceramic fibers. Apparently, rolls made solely of carbon matrixes reinforced with carbon fibers (CFC) have apparently a better resistance against thermal shocks than the ones comprising at least a ceramic matrix. As illustrated in FIG. 6, the roll core can be made of a carbon-based material 19 and a layer of CFC 20 around said carbon-based material.

Preferably, said roll is made of ceramic. The ceramic permits a very good resistance to corrosion because it is inert to the bath condition.

Preferably, said connection part 7 is made of metal. More preferably, said connection part 7 is made of steel. Such connection part made of metal enhances the mechanical resistance. Moreover, it eases the fastening of the connection part 7 to the sleeve 16 because welding is possible.

Preferably, said fastening means 11 is a screw. Such fastening means have the advantage of being dismountable, so it enhances the reusability of the equipment. Said screw is preferentially screwed in a helical insert. Preferably, a piece, such as a washer, is used to hinder liquid penetration through the holes of the fastening means. On one hand, the fastening means permit centering of the axis of the shaft in relation to the roll axis, keeping a good centering during handling. On the other hand, they keep the shaft, the second part 10, in contact with a roll side 5S while in use as well as waterproofing the third part from the molten metal. It is essential because due to the different coefficient of thermal expansion between the roll and the connection part, the connection part has the tendency to be pushed away from the roll.

Figure 7:
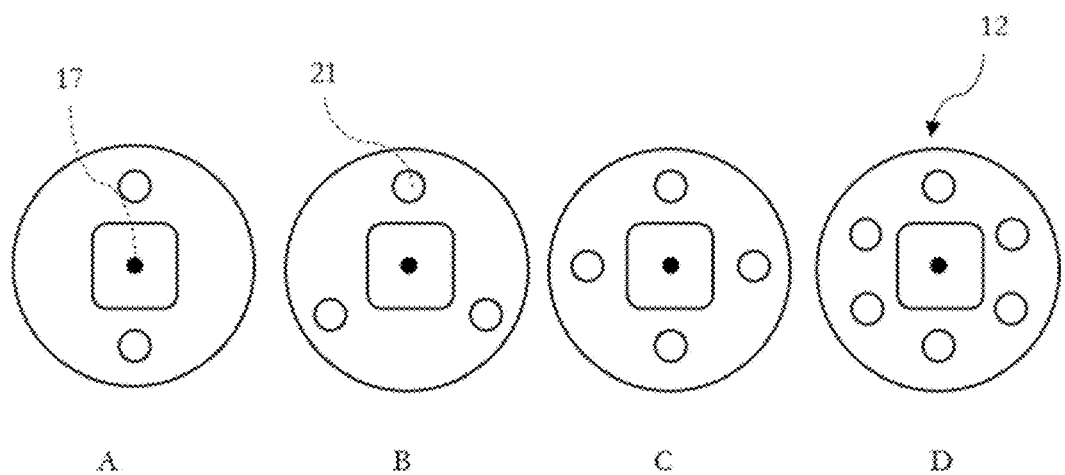
FIG. 7 exhibits different embodiments for the fastening means.

Preferably, as illustrated in FIGS. 7A-B-C-D, said second part 10 comprises holes 21 for inserting the at least three fastening means 11. Having at least three fastening means permits to ensure a better handling of the roll as well as a better centering of the shaft. It also reduces the stress on each fastening compared to the cases where there is one or two fastening means. Preferably, the barycentre of the fastening means 11 is the roll rotation axis 17. Apparently, such a disposition permits to equally divide the stress and increases the fastening means lifespan.

The invention also relates to method for installing, in an installation as described above wherein said molten metal is at a temperature $T_{molten\ metal}$, the at least one of said rolls 5 comprising the following steps:
  inserting said third part 12 of the connection part 7 into said roll 5,
  fixing said connection part 7 to the roll 5 using said fastening means 11,
  preheating said roll 5 and said fixed connection part 7 at a temperature $T_{preheating}$ between: $100°\ C. < T_{preheating} < T_{molten\ metal} + 100°\ C.$ during a period between 8 hours and 5 days,
  placing said roll 5 and said fixed connection part 7 inside said molten metal 3.

Such steps permit to optimally install the roll. Preheating said roll above 100° C. leads to a pressfitting or at least reduces the clearance which permits to move the roll and the connection parts fixed to it safely. It also removes the residual humidity. When choosing the preheating temperature, the roll resistance against oxidation should be taken into account in order to not damage said roll during the preheating. Moreover, when choosing the preheating temperature, its resistance against thermal chock should also be taken into account in order to not damage said roll during its placement inside said molten metal.

The preheating period should be long enough to have a homogeneous temperature across the roll. Said period depends on various factors such as the roll size and the roll thermal properties.

Preferably, said seal 15 is a carbon felt. Preferably, washers are used with the fastening means when possible.

Preferably, a protective coating is applied on the connection part 7 and fastening means 11 before preheating said roll and after inserting said connection part into said roll 5. Apparently, said coating protects the connection part and prolongs its lifespan. Said protective coating can be made of boron nitride.

The invention claimed is:

1. A continuous hot dipping apparatus comprising:
   a tank including a bath of molten metal inside;
   a sink roll; and
   at least one guide roll;
   at least one of the sink roll and the at least one guide roll defining a roll being supported by a bearing, the bearing being composed of at least a connection part and a bushing, the connection part including three successive parts:
   a first part connecting with the bushing,
   a second part comprising at least one fastener attached to a side of the roll, and
   a third part having a parallelepiped section with curved angles, the third part being inserted inside the roll, the connection part being made of a material having a higher thermal dilatation coefficient than the roll, the coefficient being chosen so that the third part and the roll are pressfitted through thermal dilatation when in the bath of molten metal.

2. The apparatus as recited in claim 1 wherein the roll is made of at least one carbon or ceramic matrix reinforced with carbon or ceramic fibers.

3. The apparatus as recited in claim 1 wherein the roll is made of two different carbon matrixes reinforced with carbon or ceramic fibers.

4. The apparatus as recited in claim 1 wherein the connection part is made of metal.

5. The apparatus as recited in claim 1 wherein the at least one fastener is a screw.

6. The apparatus as recited in claim 1 wherein the at least one fastener includes at least three fasteners.

7. A method for installing the roll in the apparatus as recited in claim 1 where a temperature of the molten metal is defined as a temperature Tmolten metal, the method comprising the following steps:
   inserting the third part of the connection part into the roll;
   fixing the connection part to the roll using the at least one fastener;
   preheating the roll and the fixed connection part at a temperature Tpreheating between: 100° C.<Tpreheating<Tmolten metal+100° C. for a period of 8 hours to 5 days; and placing the roll and the fixed connection part inside the molten metal.

8. The method as recited in claim 7 wherein a protective coating is applied on the connection part and at least one fastener before preheating said roll and after inserting the connection part into the roll.

* * * * *